M. D. MORAN.
SAFETY AIR RELEASE FOR CARS.
APPLICATION FILED SEPT. 10, 1915.
1,241,649. Patented Oct. 2, 1917.
3 SHEETS—SHEET 2.
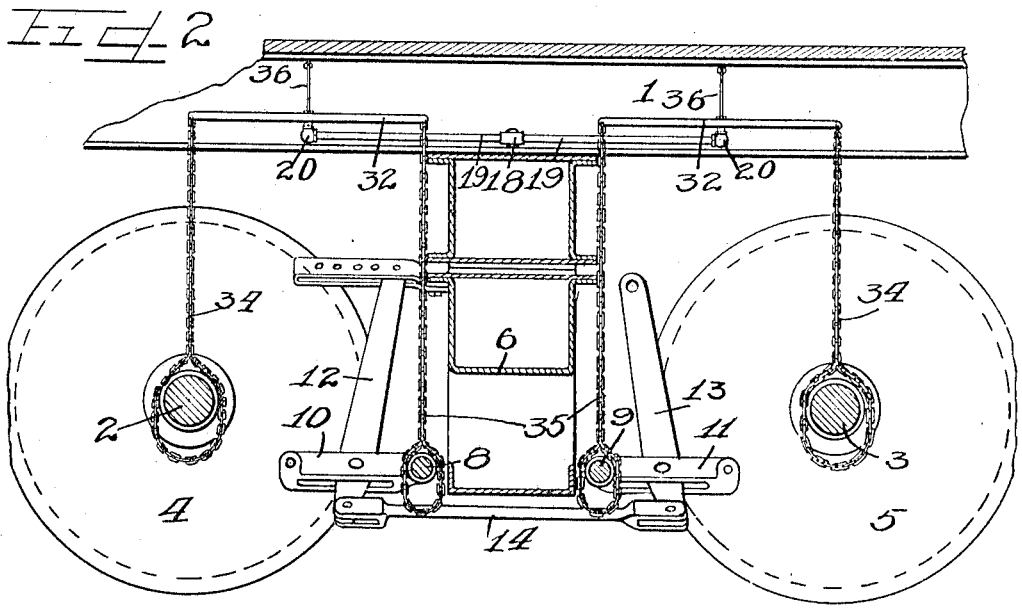
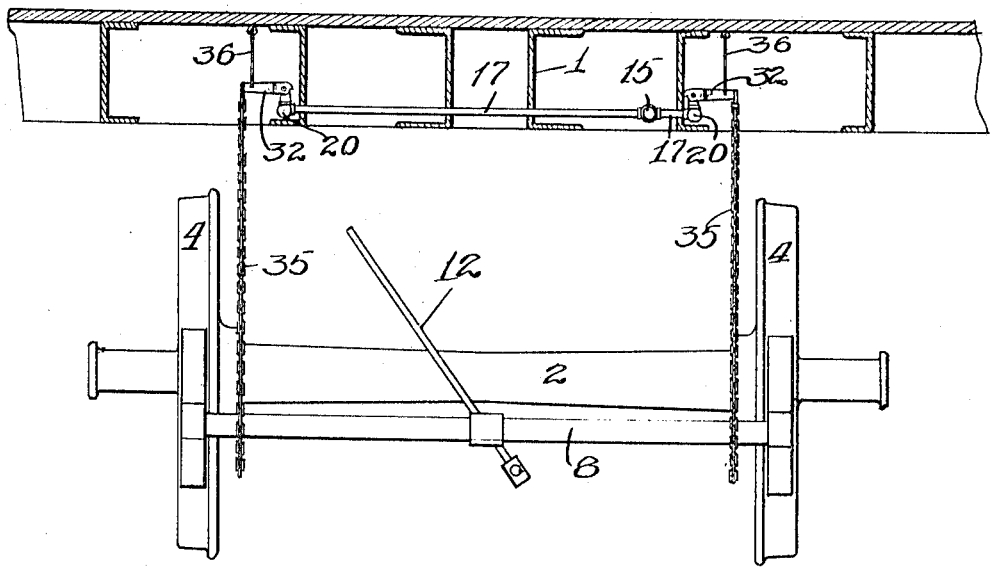

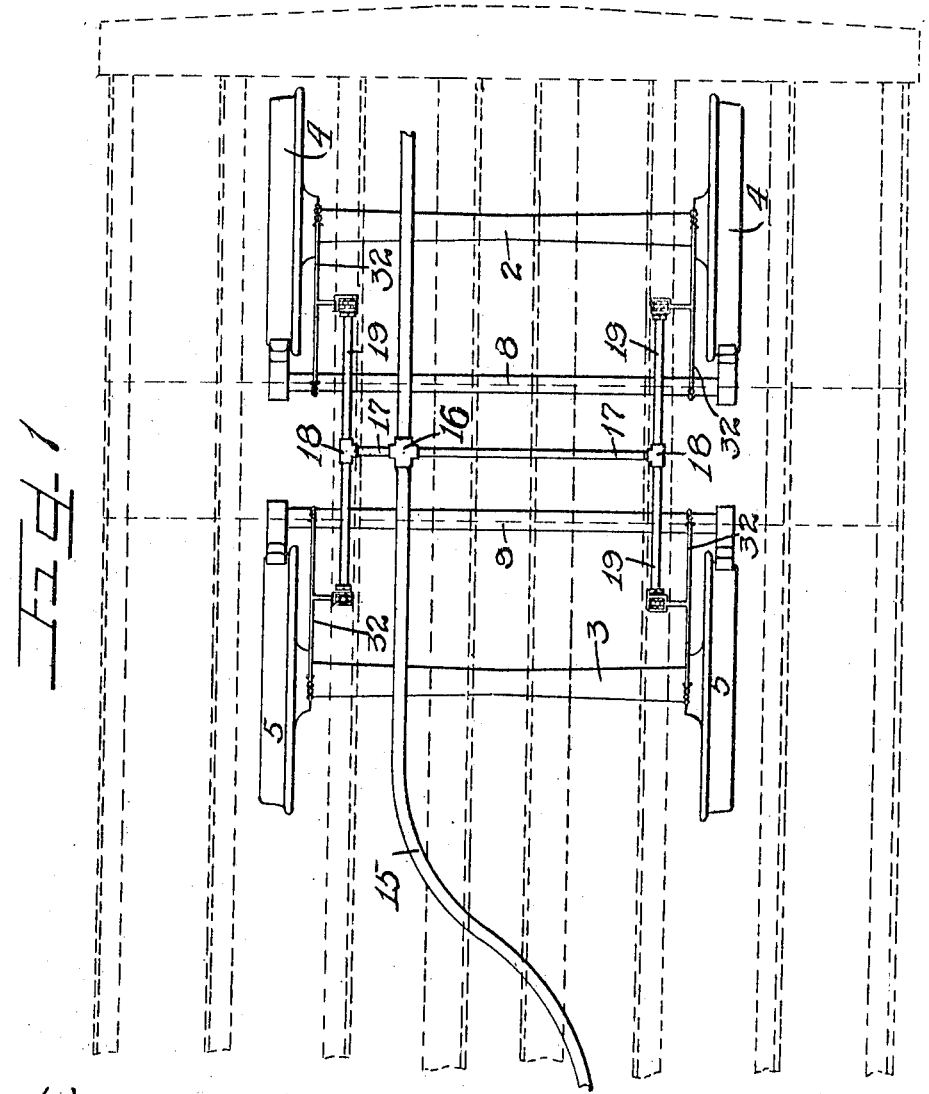

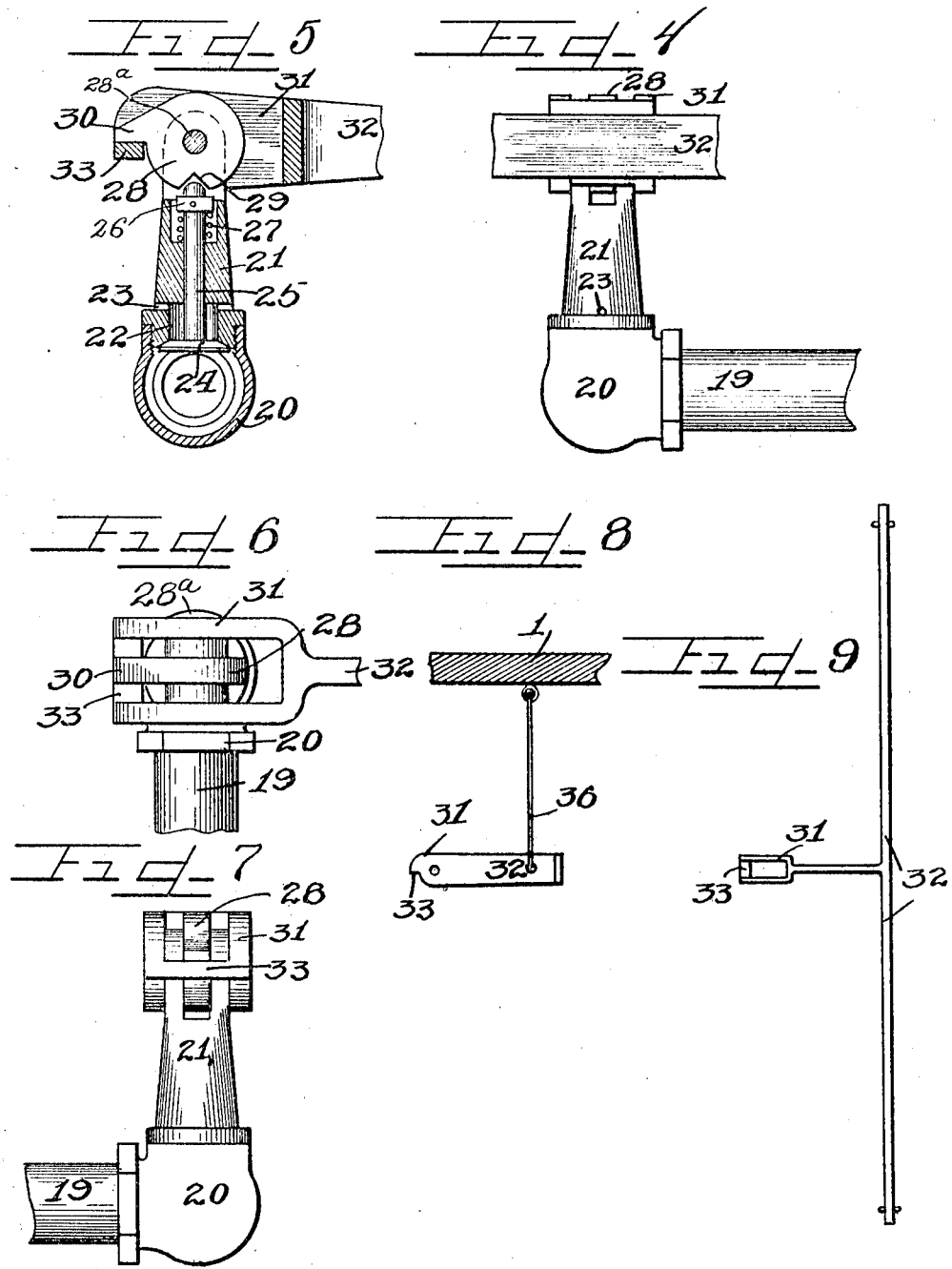

UNITED STATES PATENT OFFICE.

MICHAEL D. MORAN, OF CHICAGO, ILLINOIS, ASSIGNOR OF ONE-HALF TO JOSEPH L. LYNCH, OF CHICAGO, ILLINOIS.

SAFETY AIR-RELEASE FOR CARS.

1,241,649.   Specification of Letters Patent.   Patented Oct. 2, 1917.

Application filed September 10, 1915. Serial No. 49,990.

*To all whom it may concern:*

Be it known that I, MICHAEL D. MORAN, a citizen of the United States, and a resident of the city of Chicago, in the county of Cook and State of Illinois, have invented certain new and useful Improvements in Safety Air-Releases for Cars; and I do hereby declare that the following is a full, clear, and exact description of the same, reference being had to the accompanying drawings, and to the numerals of reference marked thereon, which form a part of this specification.

This invention relates to an attachment adapted to be mounted upon the trucks of a car for the purpose of releasing the air in the air line of a train for application of the brakes to stop the train in the event of accident to a part of the brake gear of a car or the axle of a truck or derailment of one of the wheels thereof. By this invention auxiliary valves, normally closed, are connected by means of suitable pipe connections to the main air line of a train and the valves are loosely connected to parts of the brake gear as well as the axles of the car trucks, so that in the event of a brake beam becoming disconnected and dragging, or breaking of an axle or derailment of a car wheel, one of the valves will be opened to cause application of the brakes on all of the cars of the train to stop the same immediately. Heretofore when such accidents have occurred oftentimes the train has traveled a considerable distance before the engineer has been made aware of the fact, and as a consequence great damage has resulted.

It is an object therefore of this invention to construct a safety appliance for attachment to car trucks acting automatically to cause application of the brakes on all of the cars of the entire train in the event of accident to any part of the brake gear or trucks of any one of the cars.

It is also an object of this invention to provide a construction wherein pipe connections are associated with the main train line on each of the cars and provided with normally closed valves having actuating levers suitably connected to the axles and brake beams of a car truck to be instantly actuated in the event of accident thereto to open the valves and release the air in the air line and cause application of the brakes throughout the train, It is also an object of this invention to construct a safety appliance for attachment on a car truck wherein means are provided to release the air in the main train line in the event of accident to the brake gear or axle or wheels of the car truck by mechanisms positively connected for operation to the brake gear and axles of the truck.

It is furthermore an important object of this invention to construct a safety device comprising a plurality of valves connected by suitable pipe connections to the main train line of a car, each of said valves being operable to open position by a lever connected by chains to the brake beams of a brake gear and to the axles of the car truck on which said gear is mounted, so that in the event of accident to the axles, the wheels, or the brake gear of the truck, one or more of said chains will be operated to actuate the levers and open one or more of the valves to release the air in the train line and cause application of the brakes on the cars of the train.

It is finally an object of this invention to construct a simplified and improved form of safety device acting automatically to cause application of the brakes of a train in the event of accident to any of the trucks of the cars.

The invention (in a preferred form) is illustrated in the drawings and hereinafter more fully described.

In the drawings:

Figure 1 is a diagrammatic plan view of a car truck showing the body of the car frame in dotted lines and illustrating the adaptation of my invention to the car truck.

Fig. 2 is a fragmentary detail vertical section with parts omitted, illustrating diagrammatically the association of my invention with parts of the truck.

Fig. 3 is a fragmentary sectional view illustrating an end view of the mechanisms shown in Fig. 2.

Fig. 4 is an elevational view of one of the valves used in the apparatus comprising my invention.

Fig. 5 is a detail section therethrough.

Fig. 6 is a top plan view of one of the valves and a fragment of the operating lever therefor.

Fig. 7 is an end view of the device shown in Fig. 6.

Fig. 8 is an end view of the T-bar or lever for actuating a valve, showing the suspension therefor.

Fig. 9 is a plan view of said T-bar or lever.

As shown in the drawings:

The reference numeral 1, indicates as a whole the body frame or car structure of any type of car whatsoever, shown in dotted lines in Fig. 1, and fragmentarily in full lines in Figs. 2 and 3, and mounted in the usual manner at one end of the car frame is a truck provided with axles 2 and 3, on which are car wheels 4 and 5, respectively. As shown in Fig. 2, a bolster 6, extends between the axles 2 and 3, parallel thereto, and of course is connected in the usual manner with the framework of the car.

Associated with the car truck in the usual manner are brake beams 8 and 9, of an inside hung brake gear, and pivoted on extensions 10 and 11, respectively thereof is a dead brake lever 12, and a live brake lever 13, which, at their lower ends, are suitably connected for simultaneous movement by a link 14. The main train line or air line by which the brakes are controlled, is denoted by the reference numeral 15, and at a convenient point at which the line passes above the trucks of the car, has connected therein a cross 16, and connected thereto are similar branch pipes 17. T's 18, are connected at the ends of said branch pipes 17, and connected in said T's are pipes 19, each, at its ends, provided with a valve. The construction of said valves is clearly shown in Fig. 5, and consists of a casing 20, into which said pipe 19, leads, and is connected in any suitable manner, and threaded into the upper portion of said casing 20, is an upright element 21, the lower end of which, as shown in Fig. 5, is provided with an interior passage 22, communicating with a plurality of laterally directed passages 23, which open through the sides of said upright member. The lower end of said upright member 21, forms a valve seat for a puppet valve 24, the stem 25, of which extends upwardly through an axial passage in said member, and at its upper end is provided with a collar 26, between which and the lower wall of a recess provided in the upper end of said upright member, is disposed a compression spring 27, acting normally to hold said valve 24, upwardly, closed against its seat. For the purpose of actuating said valve 24, to open the same a cam 28, is rotatably mounted on a pintle 28ª, in the upper slotted end of said upright member 21, and, as clearly shown in Fig. 5, is provided with a notch 29, into which the upper end of the stem 25, normally projects when said valve is in closed position. Thus, when said cam is rotated a sufficient amount, said stem is depressed against the compression of the spring 27, to open the valve 24, and permit release of air, the same passing upwardly through the passage 22, and out through the laterally directed passages 23. Said cam 28, is provided with an outwardly projecting tooth 30, and fitting therearound is the yoked end 31, of a T-bar 32, which is also pivoted on said pintle 28ª, said yoked end 31, having a cross-piece 33, which normally engages beneath said tooth 30.

Connected to one end of each of said T-bars 32, is a chain 34, which hangs downwardly and is provided with a loop on its lower end engaging loosely around one of the axles, either 2 or 3, as the case may be, and secured on the other end of said T-bar is another chain 35, which extends downwardly and at its lower end is provided with a loop engaging loosely around one of the brake beams either 8 or 9, as the case may be. Each of said T-bars is suspended from a convenient point on the car frame by a wire 36, sufficiently strong to normally support the T-bar under normal conditions, but breaking in the event of accident to any portion of the truck, the axle, wheels, or the brake gear thereof, when stress is applied upon either of the chains 34 or 35, thus opening one of the valves on the pipe connections 19, to release the air in the main train line 15.

The operation is as follows:

As the car is traveling along in the event that one of the brake beams, either 8 or 9, as the case may be, becomes broken or detached so as to drag, the weight thereof will pull downwardly upon one of the chains 35, there being two chains connected to each of the brake beams, thus pulling downwardly upon the T-bar 32, causing breakage of the suspension wire or cord 36. When the T-bar 32, swings downwardly, after breakage of the suspension wire 36, the cross-piece 33, on the inner yoked end of said bar, moves the tooth 30, of the cam 28, upwardly, thus causing said cam to depress the valve stem 25, and the closure 24, therewith to open the valve and permit release of air from the main train line 15, thus causing application of the brakes on all the cars of the train. It is obvious from the construction that in the event of a wheel becoming derailed and thus dropping downwardly, or in the event of one of the axles breaking, a pull will be exerted upon one of the chains 34, thus breaking the suspension wire 36, and causing actuation of one of the valves to open position. Only a loose connection is provided at the lower end of said chains 34 and 35, with the axle and brake beams respectively in order to permit a certain amount of movement to take place without imparting stress to said chains under ordinary conditions of running.

I am aware that a number of variations may be made in the construction, such as utilization of one valve operated by a series of levers or chains from the different axles and brake beams, or the use of more than the four valves shown for each truck, if so desired. However, I do not purpose limiting the patent granted otherwise than necessitated by the prior art.

I claim as my invention:

1. In a device of the class described the combination with a car, its trucks and main brake air line, of breakable means associated with the trucks suspended from the car, and means supported thereby acting to release the air in the air line to cause application of the brakes of the train in event any one of said breakable means is broken by an accident to the trucks or parts thereof.

2. In an apparatus of the class described the combination with a car, its trucks, and the main air line for the brakes, of chains connected to the axles and brake beams of the trucks, and release valves connected to said chains for operation thereby and connected to said main air line to release the air in said line in the event of accident to said truck axles or brake beams.

3. In a device of the class described the combination with a car truck, the wheels and axles thereof, and air brake line, of release valves connected to said air brake line, actuating levers for said valves, breakable means supporting the same, and chains connected to said actuating levers and to the brake beams and axles of said truck to cause actuation of said levers and opening of said valves in the event of dragging of a brake beam or breaking of an axle or wheel of the truck causing said supporting means to break.

4. In a device of the class described the combination with a car truck and air brake line, of release valves connected to said air brake line, actuating levers therefor, chains connected at each end of each of said actuating levers, one of said chains of each of said levers loosely connected to the axles of the car truck and the other of the chains of each of said levers loosely connected to the brake beams of the truck to cause actuation of the valves to open the same in the event of accident to the truck.

5. In a device of the class described the combination with a car truck and the main air brake line, of auxiliary pipe connections connected thereinto, release valves on each of said auxiliary pipe connections, cams for operating said valves to open position, forked levers adapted to actuate said cams, and means connecting each of said levers with an axle and a brake beam of the car truck to actuate said levers to cause opening of said valves to release air in the air line in the event of accident to the car truck.

6. In an apparatus of the class described the combination with a car truck and main air line for the air brakes associated with the car truck and wheels thereof, of auxiliary valves connected to said main air line and normally closed, and means connected to open the same, mechanism normally suspended from the body of the car adapted to be broken by accident to said car truck to permit release of the valves and opening of the air line to apply the brakes on all cars of the train.

7. A safety appliance for cars comprising a venting valve connected to the air brake system of the car, a member detachably secured to the car through the medium of breakable connections, and positioned to be engaged by the car axle by downward movement of the latter so that the added weight of the axle will break the connections and allow said member to fall, and connections between said member and the valve whereby the falling movement of the member will open said valve.

In testimony whereof I have hereunto subscribed my name in the presence of two subscribing witnesses.

MICHAEL D. MORAN.

Witnesses:
CHARLES W. HILLS, Jr.,
EARL M. HARDINE.